Dec. 22, 1970   F. G. STARK   3,549,227
DESK OR LIKE ARTICLE OF FURNITURE
Filed April 16, 1969   8 Sheets-Sheet 1
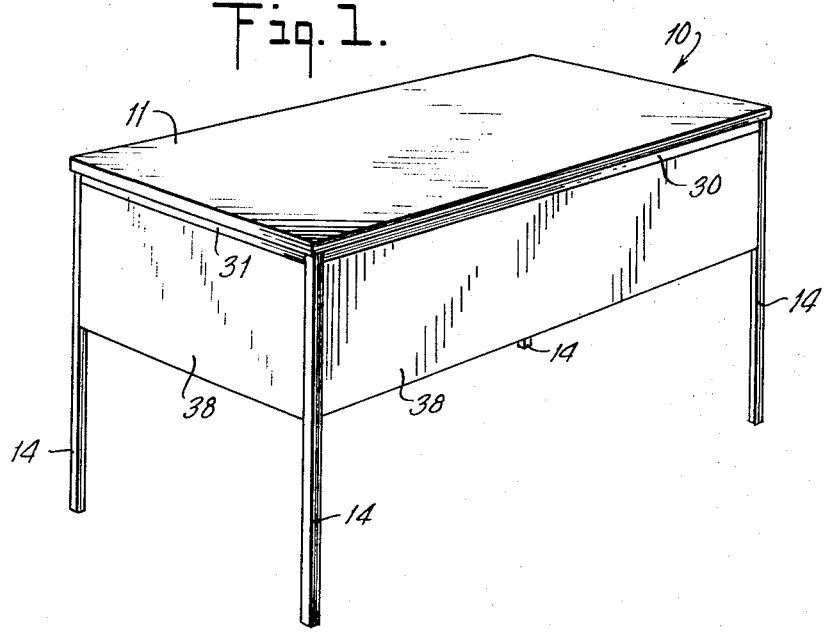
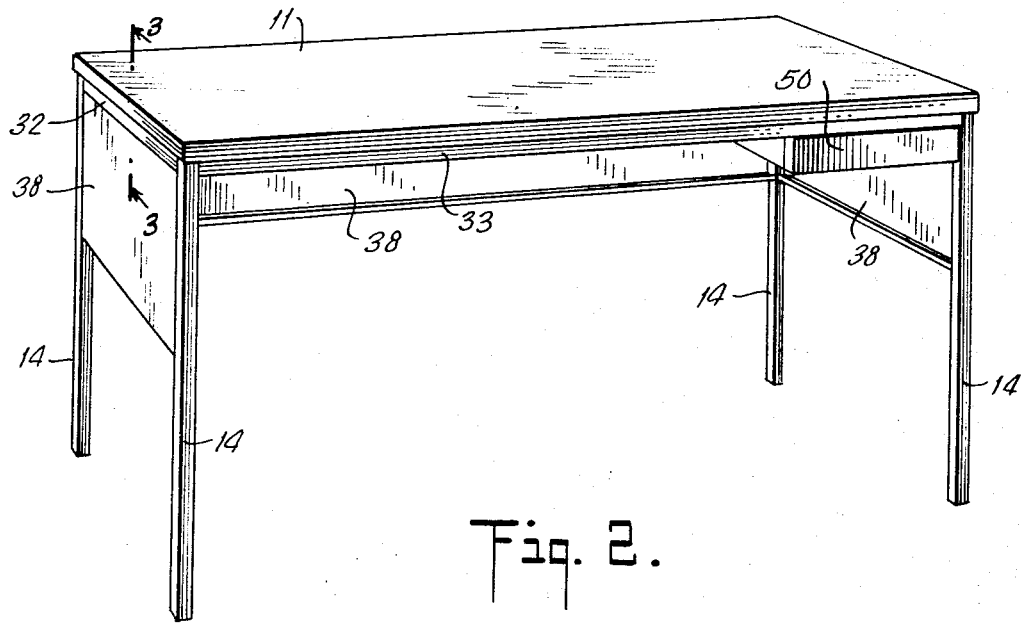
INVENTOR.
FOREST G. STARK
BY
Christopher C. Dunham
ATTORNEY

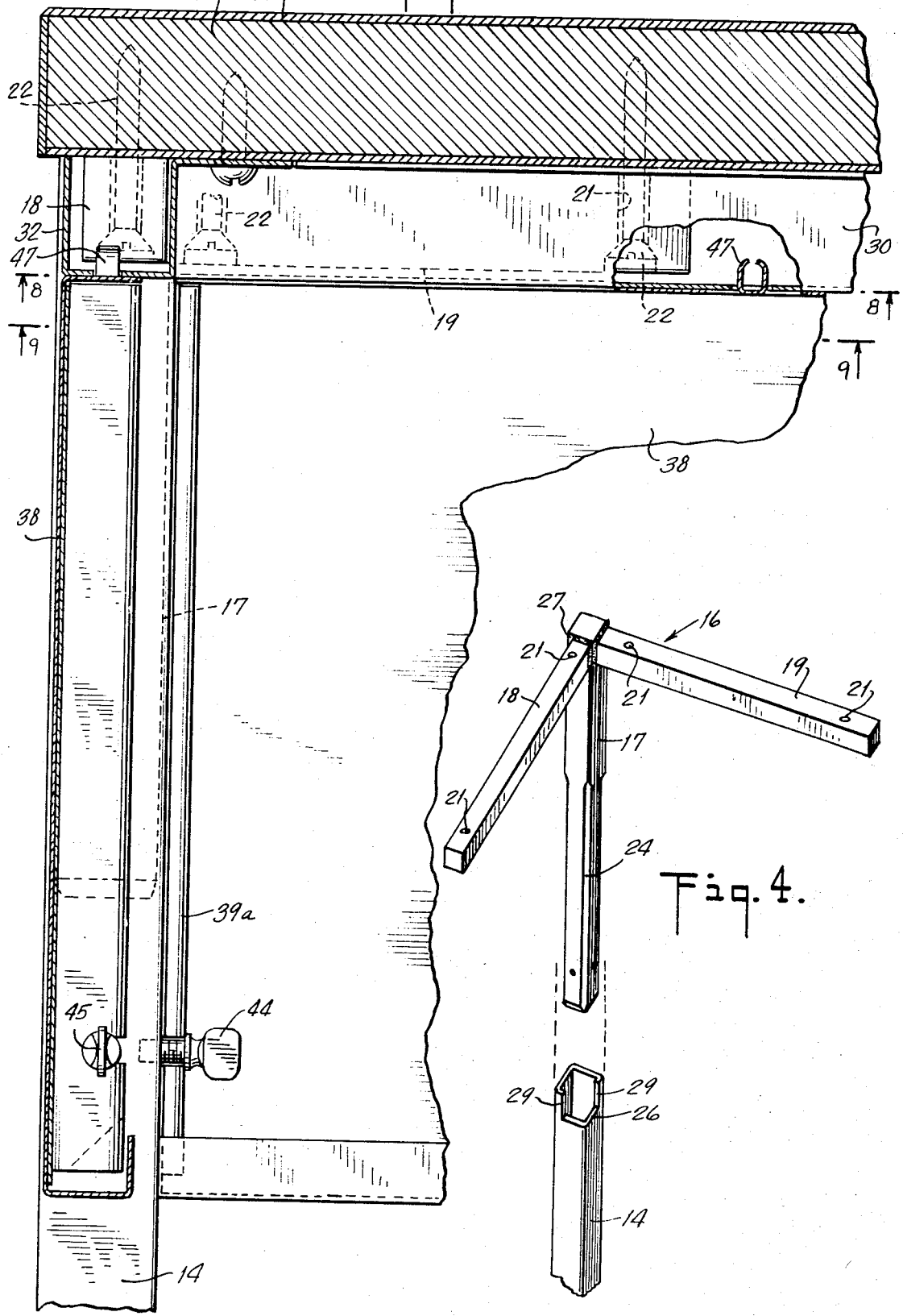

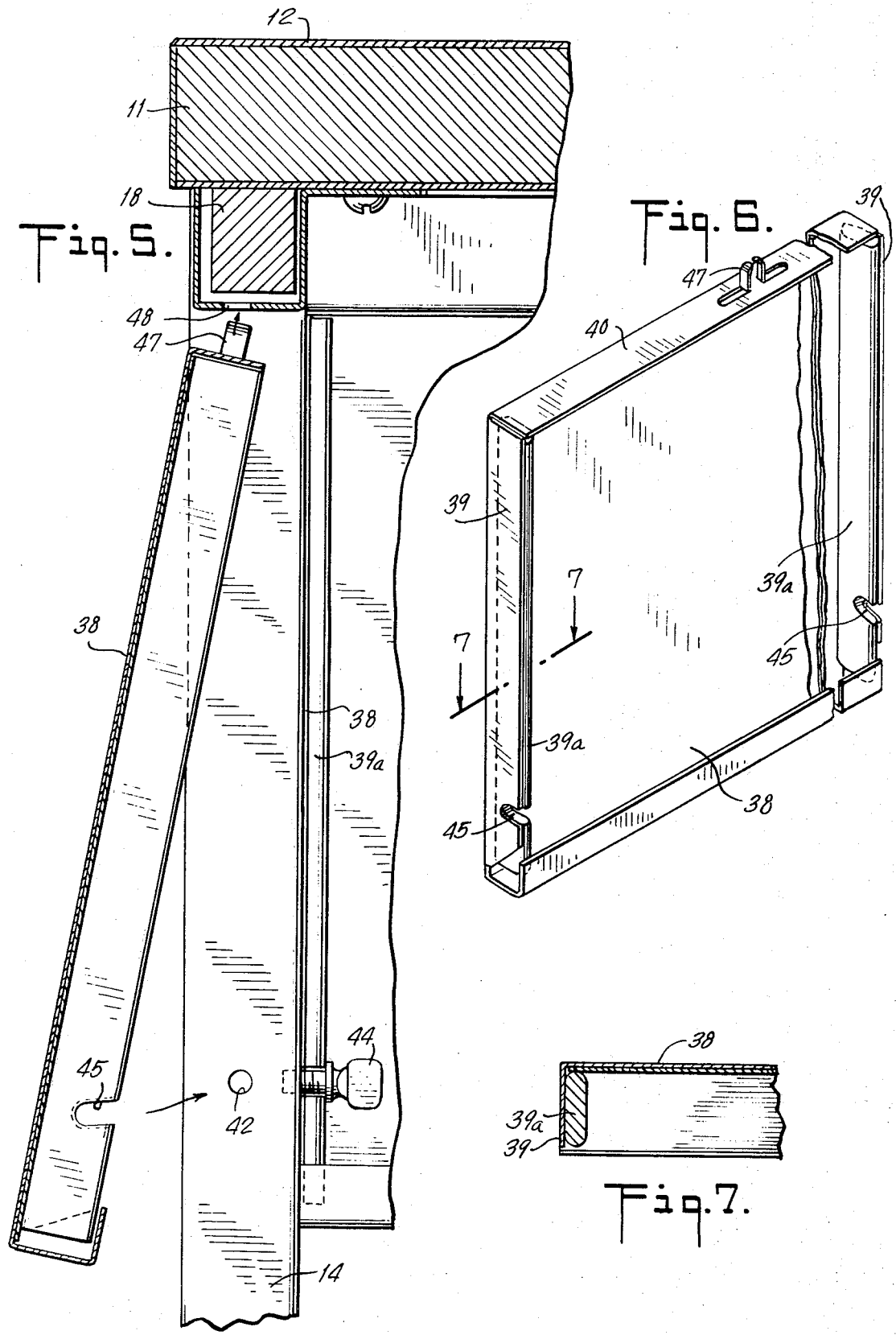

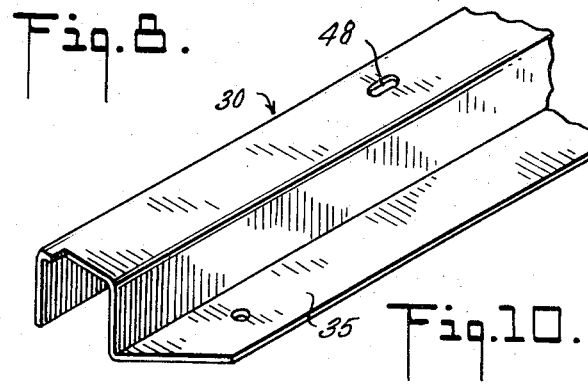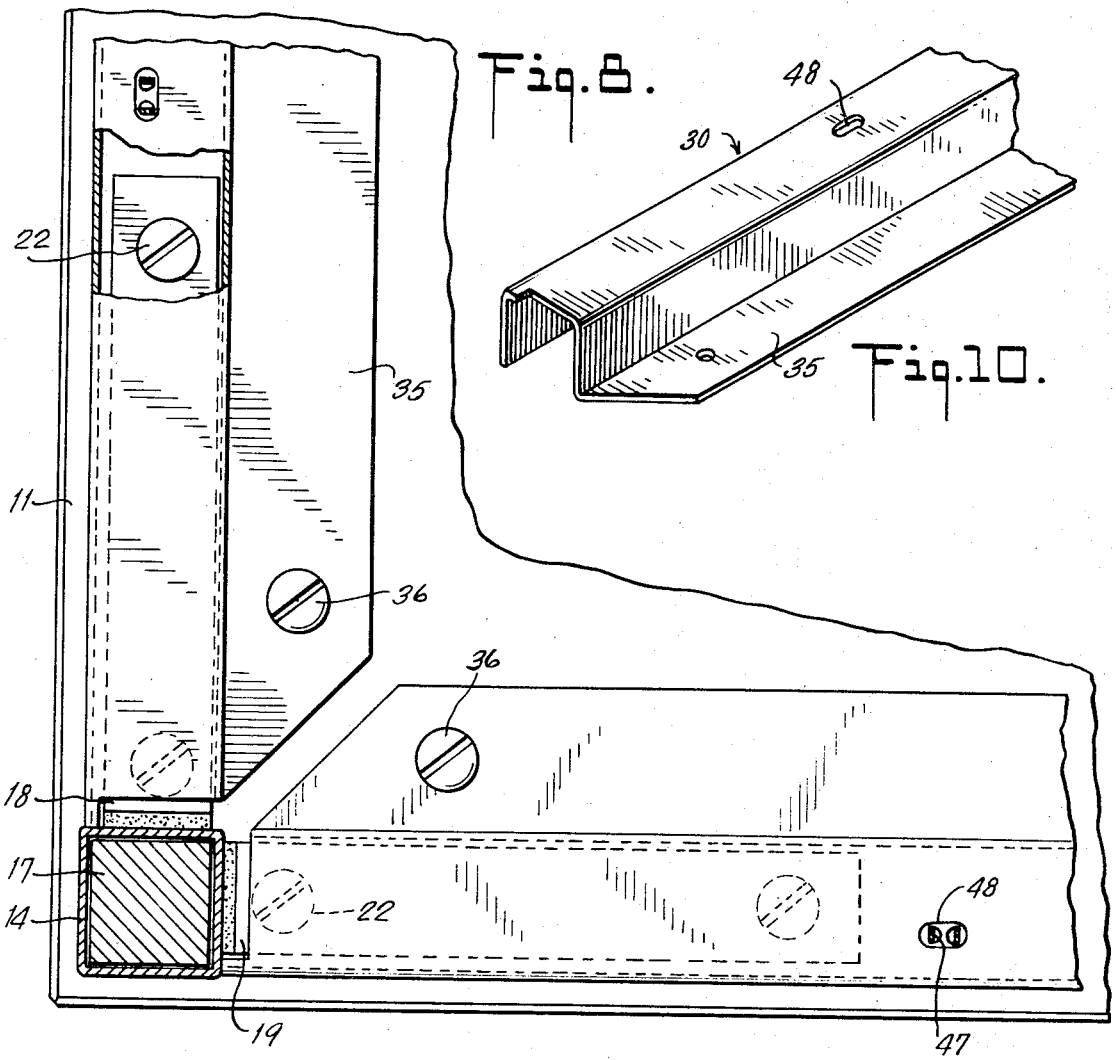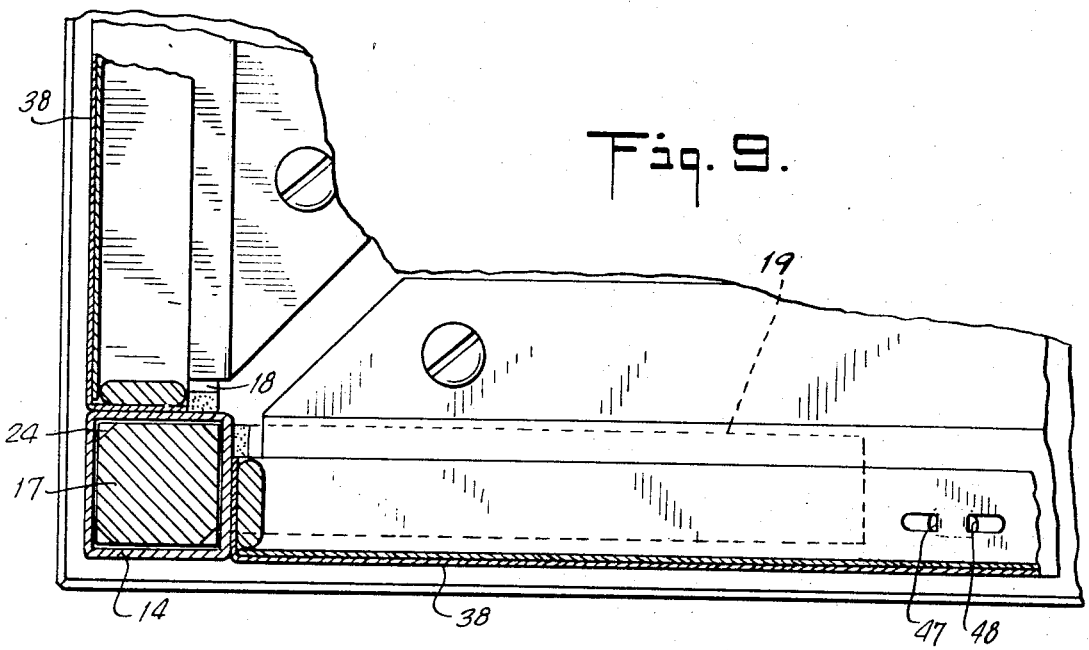

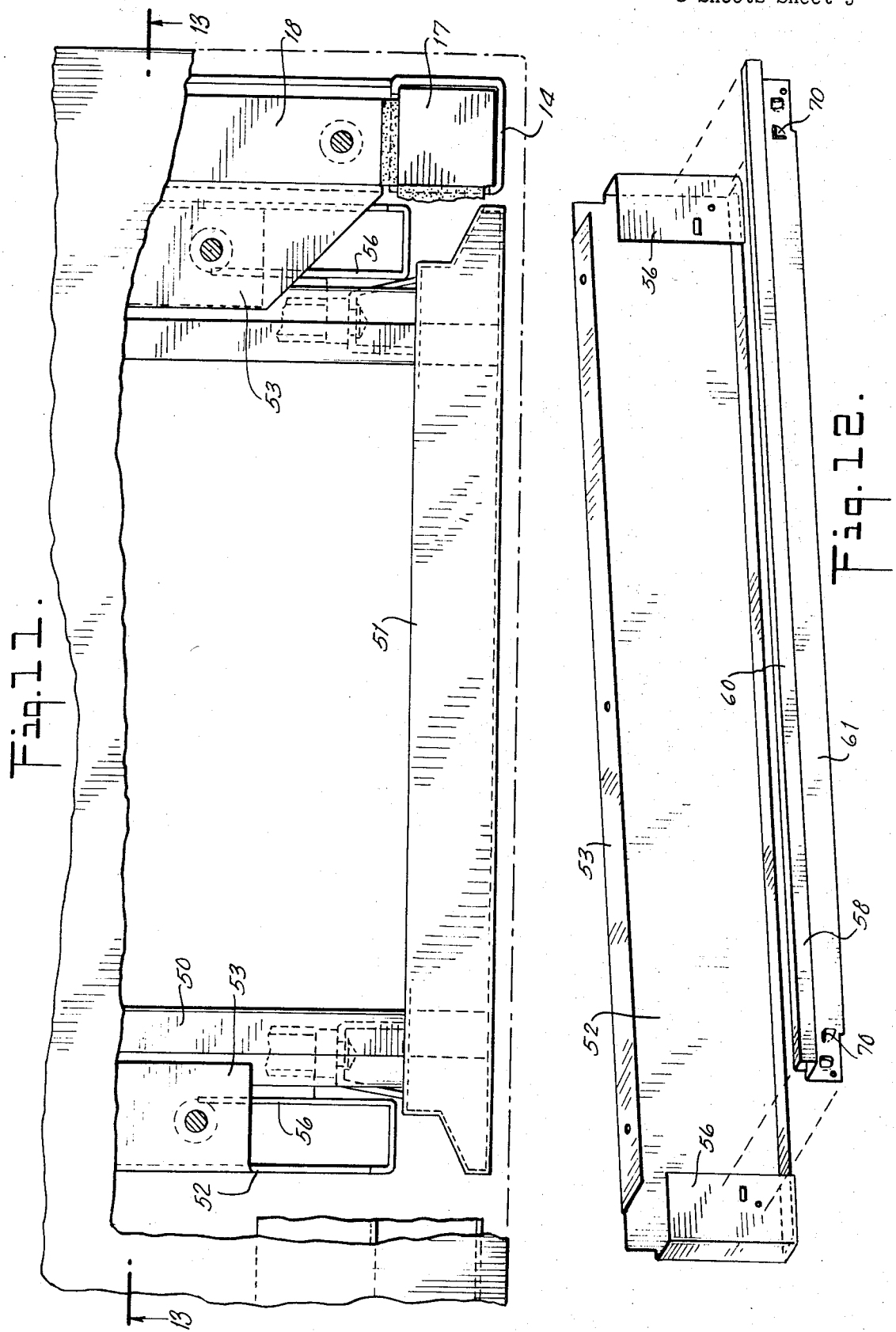

Dec. 22, 1970　　　　　　　F. G. STARK　　　　　　　3,549,227
DESK OR LIKE ARTICLE OF FURNITURE
Filed April 16, 1969　　　　　　　　　　　　　　　　8 Sheets-Sheet 7
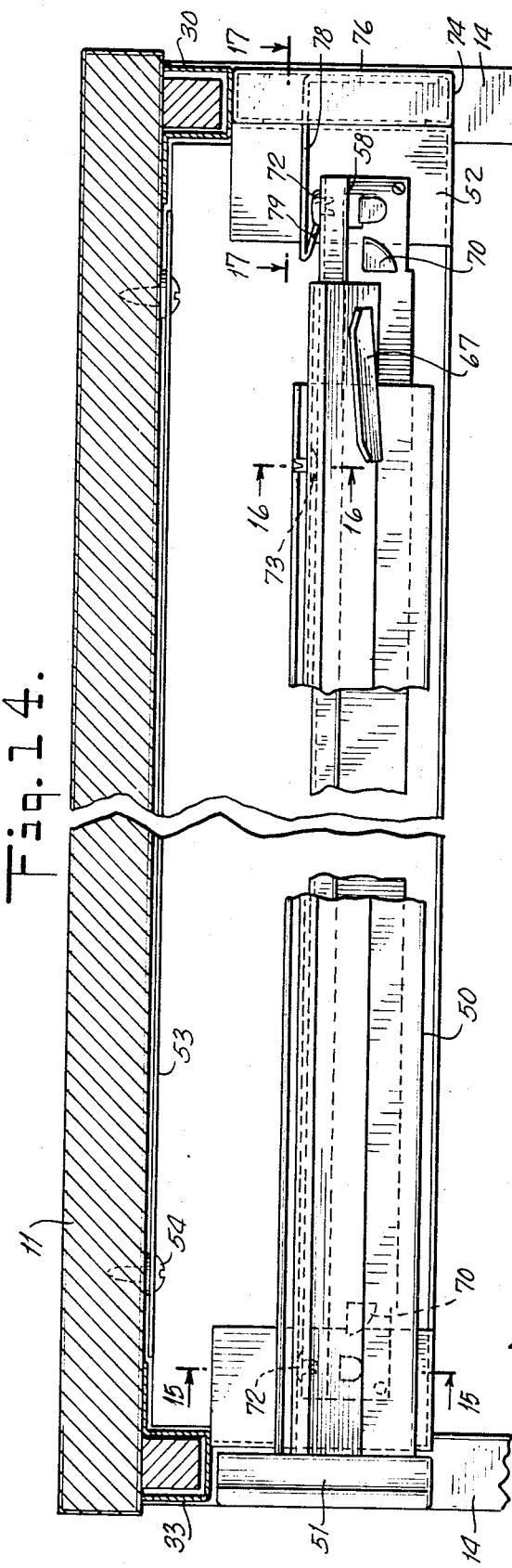
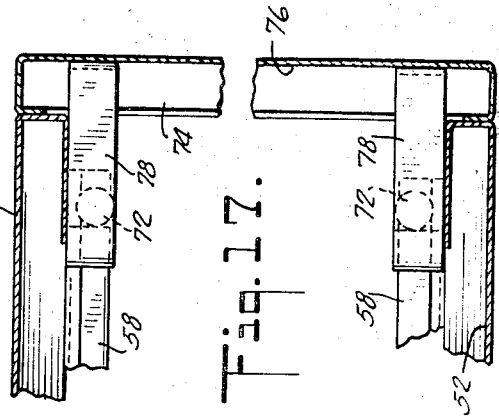
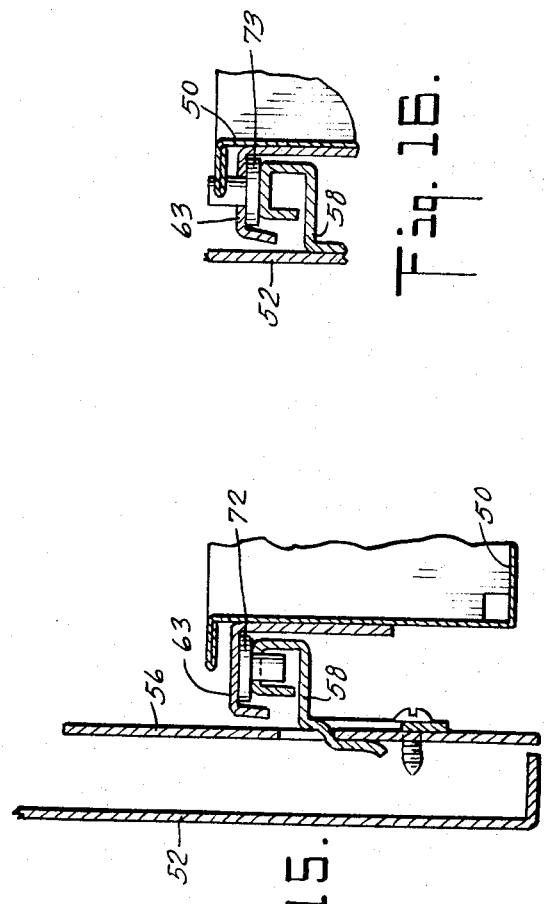

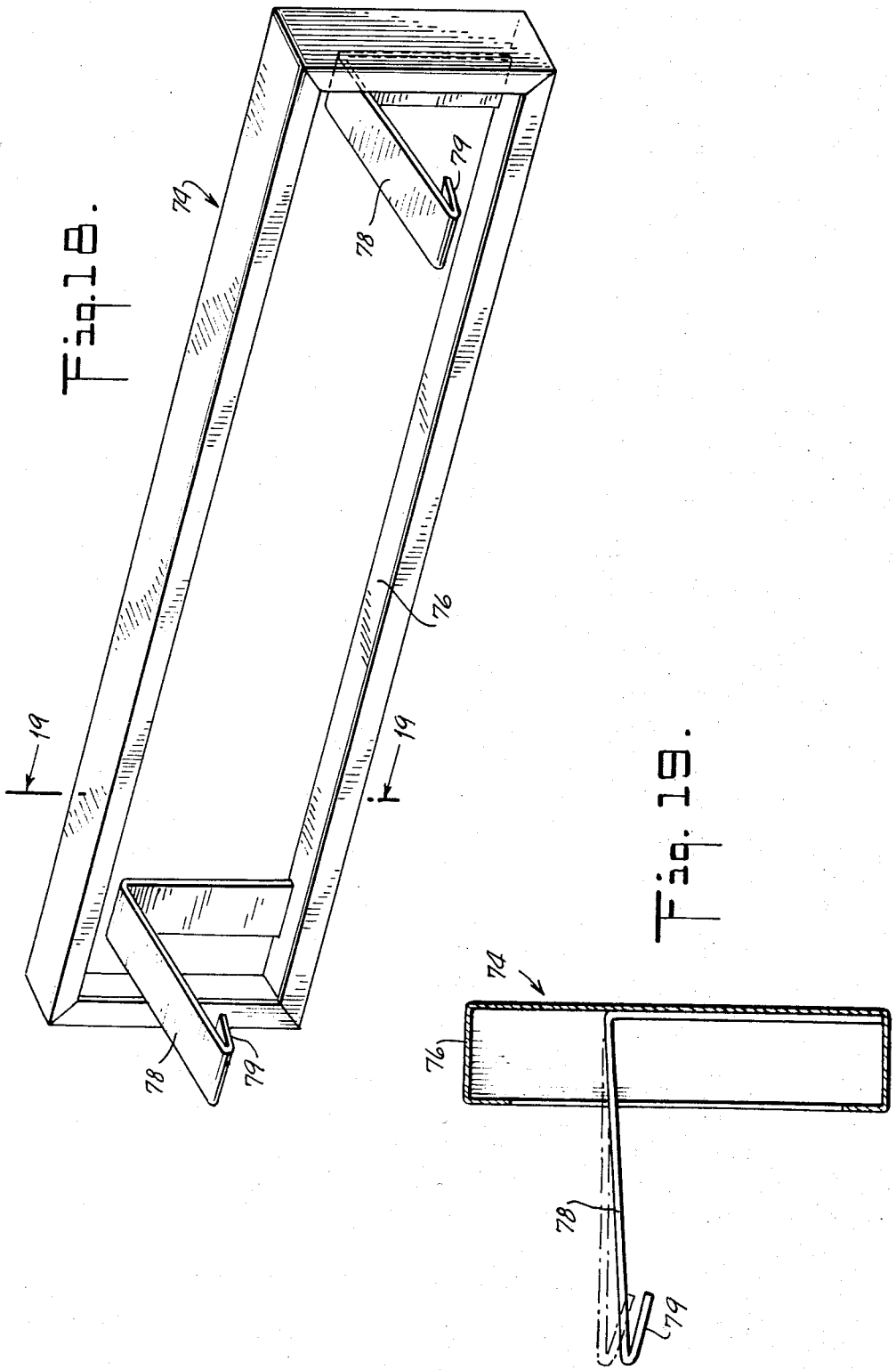

United States Patent Office 3,549,227
Patented Dec. 22, 1970

3,549,227
DESK OR LIKE ARTICLE OF FURNITURE
Forest G. Stark, Jamestown, N.Y., assignor to Art Metal-Knoll Corporation, Jamestown, N.Y., a corporation of Delaware
Filed Apr. 16, 1969, Ser. No. 816,606
Int. Cl. A47b 17/00
U.S. Cl. 312—194                                    8 Claims

ABSTRACT OF THE DISCLOSURE

A desk or the like having a flat rectangular top panel, four hollow metal tube legs of square cross section, and four brackets mounted on the lower surface of the top panel respectively adjacent to the four corners thereof for securing the legs rigidly to the top panel. Each bracket includes a solid metal post of square cross section press-fitted within the upper end of one of the legs and having bevelled vertical edges; and a pair of horizontal solid metal arms rigidly secured to and extending divergently from the upper end of the post along the top panel lower surface, in respectively parallel relation to the adjacent edges of the top panel, each arm being secured to the panel by screws. Horizontal channel sections, having inwardly projecting flanges secured by screws to the top panel lower surface, extend along the panel lower surface between adjacent brackets in parallel relation to the panel edges and enclose the horizontal arms of the brackets. A removable vertical panel may be mounted between adjacent legs, immediately beneath a horizontal channel section. The desk may also include a drawer, slidably supported on rails extending from side to side of the desk across the top panel lower surface and adapted to receive the drawer from either side of the desk; and a filler panel, simulating a drawer head in appearance, may be detachably secured to the ends of the rails on the side of the desk opposite to that on which the head of the drawer is located.

BACKGROUND OF THE INVENTION

This invention relates to furniture constructions and more particularly to desks or like articles of furniture.

Conventional office desks are ordinarily more or less massive structures having drawer pedestals and/or vertical panels which contribute significantly to the desired stability and rigidity of the desk. Certain contemporary trends in furniture design, however, favor desk constructions which are essentially open below the top horizontal panel and are supported on legs at the four corners, without vertical panels or other bracing substructure between the legs. Such constructions are advantageous not only from an aesthetic standpoint but also for acoustical reasons, because of the elimination of extended vertical surfaces which in conventional desks may tend to act as sounding boards for office noises. Reduction in office noise is especially important in modern open office layouts wherein a large number of desks may be grouped in different work areas within a single room.

When pedestals, vertical panels and other substructure are omitted from the desk, difficulty is encountered in providing a construction that will be adequately rigid and stable for heavy office use. Heretofore, table constructions and the like have been proposed having a rigid horizontal rectangular metal frame with attached legs, on which the table top panel rests. While such an arrangement may afford adequate stability, the frame tends to be relatively difficult to assemble and the use of horizontal structural metal members forming a complete rigid rectangular supporting frame adds weight and cost.

It would be desirable to provide an open desk construction consisting essentially of four legs and a top, yet having satisfactory stability. It would also be desirable that such construction be capable of ready assembly, and that the dimensional tolerances of the interconnecting parts be sufficiently broad so as to enable practicable manufacture at comparatively low cost. At the same time, the produced desk should have a clean, finished and aesthetically pleasing appearance. For convenience of manufacture and assembly, the various components of the desk structure should so far as possible be interchangeable.

It would also be desirable to provide a desk structure convertible by the user, without special tools, from an entirely open desk to a desk having so-called modesty panels or vertical skirt panels extending between one or more pairs of legs, in accordance with the user's preference. Again for the user's convenience, it is often desirable to provide a drawer in the desk for storing pencils, paper clips and other office supplies.

Further, it is desirable to provide a desk that is capable of use either as a left hand or a right hand drawer desk and is also capable of use as a desk from either side without the necessity of physically turning the desk around. It will be appreciated that the foregoing desired features of convertibility and reversibility facilitate adaptation of a single piece of furniture to accommodate the individual preferences of different users, and/or rearrangements in office layout.

SUMMARY OF THE INVENTION

The present invention in a broad sense contemplates the provision of an article of furniture comprising, in combination, a top panel having a horizontal lower surface; a plurality of identical legs each comprising a straight hollow metal tube of square cross section open at least at one end; and a plurality of identical brackets, equal in number to the legs, mounted at spaced localities on the panel lower surface for securing the legs rigidly in vertical position to the panel. Each of the brackets comprises a vertical solid metal post of square cross section dimensioned to fit tightly within one of the legs, the post having longitudinal bevelled edges extending downwardly to its lower end and being press-fitted within the open end of one leg; and a pair of horizontal solid metal arms, each rigidly and fixedly secured at one end to the upper end portion of the post and extending divergently therefrom along the panel lower surface, each of the arms being secured to the panel by a plurality of longitudinally spaced screws.

As embodied in a desk having a rectangular top panel, the structure of the invention includes four legs and four brackets respectively mounted adjacent to the four corners of the top panel. The two horizontal arms of each bracket extend at right angles to each other, in respectively parallel relation to the adjacent edges of the panel. The horizontal arms of adjacent brackets extending along a common edge of the panel are aligned with each other. An upwardly opening metal channel section extends between each pair of adjacent brackets in parallel relation to an edge of the panel, and at its opposite ends receives and encloses the horizontal arms of the two brackets which extend parallel to that edge; each of these channel sections has an inwardly projecting longitudinal flange contiguous with and secured by screws to the top panel lower surface to hold the panel section in place.

In the described construction, the brackets cooperate with the legs to provide a highly stable and rigid construction which is nevertheless economical and easy to assemble. The bevelled edges of the vertical bracket posts permit desirably broad dimensional tolerances of the posts and tubular legs, without sacrifice of stability and rigidity of the press-fitting engagement between the posts and legs.

The channel sections cooperate with the legs to provide a finished and aesthetically pleasing appearance for the desk.

A vertical panel having inwardly projecting side and top flanges may be positioned between two adjacent legs and immediately beneath the channel section extending between these legs. The vertical panel is held in place by thumbscrews threaded in the sides of the adjacent legs and extending through notches in the side flanges of the panel, and by a plurality of lugs which project upwardly from the top flange of the vertical panel in spaced relation to each other and are received within correspondingly spaced slots in the lower surface of the superadjacent channel section. This arrangement for mounting the vertical panel permits it to be readily installed or removed by the user.

The described desk may also be provided with a drawer slidably supported in a pair of rails extending from side to side of the desk acorss the lower surface of the top panel and fixedly secured to the top panel lower surface. These rails are adapted to receive the drawer from either side of the desk, having detent projections and glides at both ends for facilitating sliding movement of the drawer and arrest of the drawer in extended position. A filler panel having spring clips engageable with end portions of the drawer rails, and having the external appearance of a drawer head, may be mounted at the opposite end of the drawer rails from the head of the drawer to provide a finished appearance.

BRIEF DESCRIPTION OF THE DRAWINGS

FIG. 1 is a rear perspective view of a desk embodying the present invention in a particular form;

FIG. 2 is a front perspective view of the desk of FIG. 1;

FIG. 3 is an enlarged fragmentary elevational sectional view of the desk of FIGS. 1–2, taken along the line 3—3 of FIG. 2;

FIG. 4 is an exploded perspective view of one bracket and associated leg of the desk of FIGS. 1–2;

FIG. 5 is a view similar to FIG. 3 showing the manner in which a vertical panel is mounted on the desk;

FIG. 6 is a fragmentary perspective view of the vertical panel shown in FIG. 5;

FIG. 7 is a fragmentary sectional plan view taken along the line 7—7 of FIG. 6;

FIG. 8 is a fragmentary sectional view of a corner of the desk of FIGS. 1–2, taken along the line 8—8 of FIG. 3;

FIG. 9 is a fragmentary sectional view of the same corner of the desk, taken along the line 9—9 of FIG. 3;

FIG. 10 is a fragmentary perspective view of one of the channel sections of the desk of FIGS. 1–2;

FIG. 11 is a fragmentary sectional plan view of the drawer and drawer-supporting structure of the desk of FIGS. 1–2;

FIG. 12 is an exploded perspective view of one of the drawer rails and supporting structure;

FIG. 14 is a side elevational sectional view of the drawer and supporting structure taken along the line 14—14 of FIG. 13;

FIG. 15 is a fragmentary sectional view taken along the line 15—15 of FIG. 14;

FIG. 16 is a fragmentary sectional view taken along the line 16—16 of FIG. 14;

FIG. 17 is a sectional plan view of the filler panel and drawer-supporting structure taken along the line 17—17 of FIG. 14;

FIG. 18 is a perspective view of the filler panel of FIG. 17; and

FIG. 19 is a sectional view of the filler panel, similar to that of FIG. 14 but showing the filler panel when removed from the drawer supporting structure.

DETAILED DESCRIPTION

Figure 13:
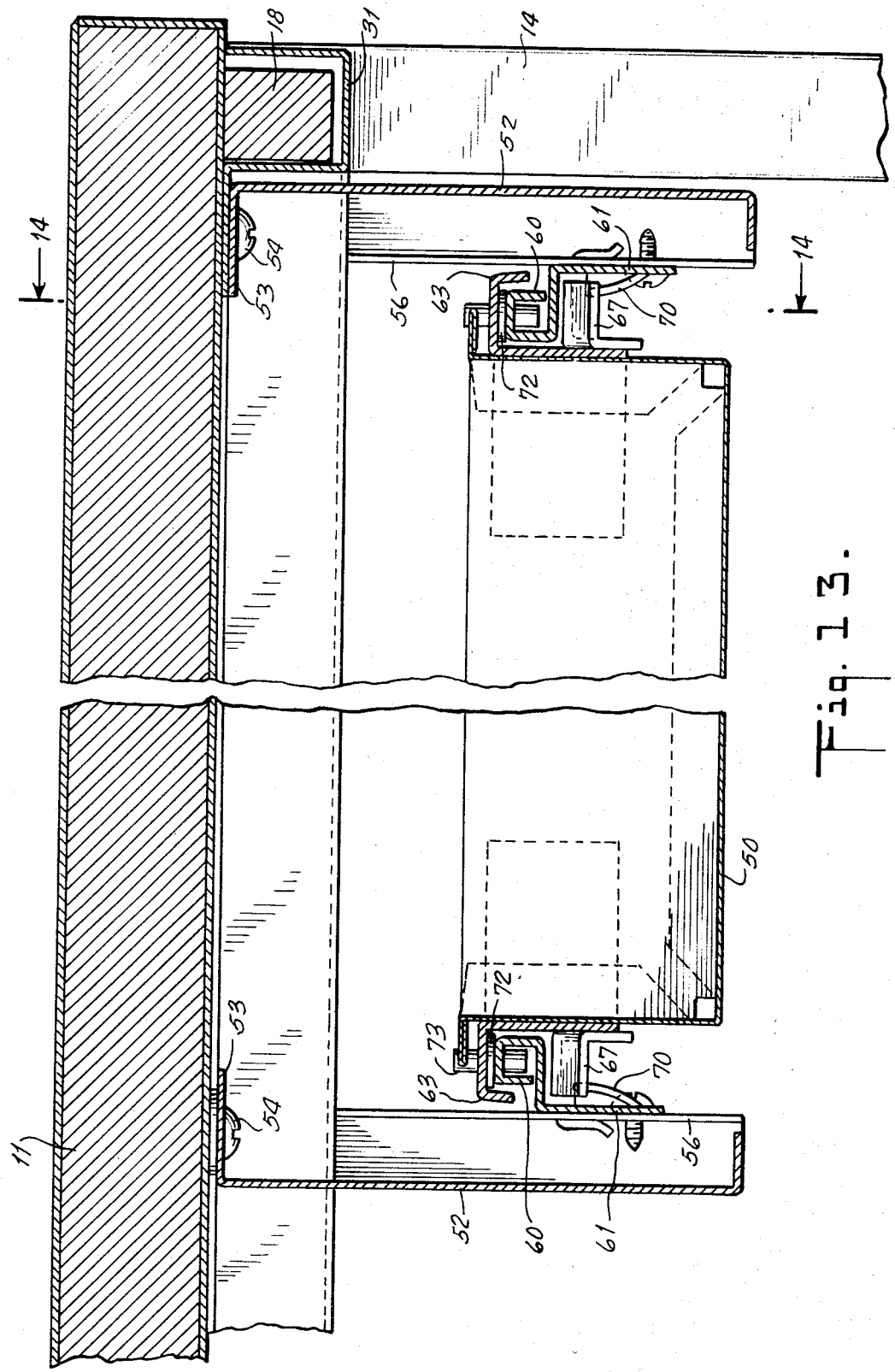
FIG. 13 is a sectional elevational view of the drawer and supporting structure taken along the line 13—13 of FIG. 11.

Referring to the drawings, the invention is shown as embodied in a desk 10 having a rigid rectangular top panel 11 fabricated for example of a suitable composition board such as particle board covered with a layer of plastic surface material 12, and four legs 14 supporting the panel 11 in horizontal position so that the upper surface of the panel constitutes a horizontal desk work surface. The four legs comprise identical lengths of hollow steel tubing, square in cross section, and open at their upper ends. The lower ends of the legs may be closed by conventional glides (not shown) mounted therein.

Four brackets 16 (one of which is shown in FIG. 4) are mounted on the lower surface of the panel 11, respectively adjacent to the four corners thereof, for securing the legs to the panel rigidly and fixedly in axially vertical position.

Each of the brackets includes a vertical post 17, constituting a length of solid steel bar of square cross section dimensioned to fit tightly within one of the tubular legs 14, and a pair of horizontal arms 18 and 19 formed from solid steel bar of rectangular cross section. One end of the arm 18 is welded to a side surface of the upper end portion of post 17, and one end of the arm 19 is similarly welded to an adjacent side surface of the upper end portion of post 17, so that the two arms extend horizontally from the upper end of the post at right angles to each other, their upper surfaces being coplanar with the upper end surface of the post. The end edges of the arms abutting the post may be chamfered and these chamfers may be filled with weld metal to provide welded connection of high strength between the arms and the post. In this way there is provided a strong and highly rigid bracket structure. Alternately, the bracket may be an integral structure.

Each of the brackets 14 is as stated positioned adjacent to one corner of the top panel 11, with the two horizontal arms 18 and 19 projecting along the lower surface of the panel 11 in respectively parallel relation to the two edges of the panel that meet to form the corner. The upper surfaces of the two horizontal arms and the upper end of the post 17 are contiguous to the panel lower surface. Each arm has a longitudinally spaced pair of axially vertical bores 21, countersunk at the lower arm surface. A flat head screw 22 is positioned in and projects upwardly through each of these bores, and is firmly screwed into the top panel 11 to hold the bracket rigidly in place on the panel.

At least in the lower portion of the post 17, all four longitudinal (i.e. vertical) edges of the post are uniformly chamfered or bevelled as shown at 24 in FIG. 4, down to the lower extremity of the post, and the lower end edges of the post may also be chamfered or bevelled. The post 17 is press-fitted within the open upper end of a leg 14, the press fit being sufficiently tight to hold the leg firmly and rigidly on the post in axially vertical position without the necessity for any welding or other positive connection of the leg to the post. The four legs 14, with their associated brackets 16, constitute the complete structural support for the top panel 11, and in cooperation with the panel provide a highly rigid and stable structure without the necessity for any cross bracing of the legs so that the desk is satisfactorily stable.

This stability of the desk derives from the rigidity of the top panel and the bracket members, the secured screwed connection of the bracket members to the top panel, and the tight press fit of the legs on the bracket member posts.

Owing to the bevelling of the longitudinal edges 24 of the post, the dimensional tolerances of the post and leg are adequately broad for practicable and economical manufacture. If the external dimensions of the post (i.e. the minimum distance between opposite major side surfaces) is slightly larger than the corresponding internal dimensions of the leg 14, the walls of the tubular leg may bend very slightly outward over the major surfaces of the post, since the bevelled post edges accommodate such bending. Thus a tight press fit of leg and post is assured without inconveniently close dimensional tolerances.

By way of specific example of the structure thus far described, the top panel 11 may be made of 1⅛-inch-thick particle board, with a plastic covering layer .06 inch thick bonded to all surfaces. The legs may be lengths of 1 inch square steel tubing with a wall thickness of .06 inch and a maximum radius of ¹⁄₃₂ inch at the corners. The vertical post 17 of each bracket may be a ⅞-inch-thick solid steel bar, with a ⅛ inch 45° bevel 24 on each vertical post corner. The horizontal arms 18 and 19 may each be a length of steel bar ¾ inch thick (horizontal dimension) and ⅞ inch thick in vertical dimension.

The chamfer of the end edges of the post 17 facilitate initial insertion of the post into a leg 14.

It will be appreciated that each edge of the top panel 11 is paralleled by two horizontal bracket arms, i.e. by the arms of the two brackets respectively positioned adjacent to the extremities of the panel edge. These two arms project in aligned relation toward each other from their respective brackets along the lower surface of the panel.

As will be understood from FIG. 4, the two outwardly facing side walls of each tubular leg 14 extend upwardly (over the outwardly facing side surfaces of the post 17 of the associated bracket 16) to abut the lower surface of the top panel 11. Each of the two inwardly facing surfaces of each leg 14, however, is partially cut away as indicated at 26 to accommodate the horizontal arms 18 and 19 of the bracket member. The outer side surfaces of the bracket member arms are offset inwardly with respect to the outwardly facing surfaces of the post 17, as indicated at 27 in FIG. 4 to enable outer portions 29 of the two inwardly facing walls of the leg 14 to extend upwardly into abutment with the top panel so that there are no exposed side edges of the leg.

Four upwardly opening steel channel sections 30, 31, 32 and 33 extend along the lower surface of the panel 11, in adjacent parallel relation to the four edges of the panel, respectively. Each of these channel sections receives and encloses at each end a horizontal arm of one of the brackets 16; i.e. each channel section is aligned with, and surrounds, the two bracket horizontal arms which parallel the top panel edge along which the channel section extends. As particularly shown in FIGS. 3 and 8–10, each channel section has an inwardly projecting longitudinal flange 35 which is flush with the lower surface of the top panel 11 and is secured thereto by longitudinally spaced screws 36 to hold the channel section in place. The channel sections and the tubular legs, which may have brushed or polished chrome surfaces, together provide the appearance of a continuous and aesthetically pleasing metal frame structure completely concealing the brackets 16.

While the described desk may be left entirely open below the top panel, vertical panels 38 may if desired be mounted between one or more pairs of the legs to partially enclose the space below the desk surface. Each of these vertical panels is a sound-insulated steel panel having inwardly projecting side frames 39 (having reinforcing bars 39a welded to their inner surfaces) and an inwardly projecting top flange 40, the panel being dimensioned to extend, in subjacent parallel relation to one of the channel sections, across the space between the two legs 14 respectively disposed at opposite ends of the channel section, and to extend for a distance of at least several inches below the channel section.

Each inwardly facing surface of each of the legs 14 has a tapped hole 42 in which a thumbscrew 44 may be threaded to assist in mounting a vertical panel. Each vertical panel side flange 39 has an inwardly opening and slightly upwardly slanted notch 45 positioned to engage a shank portion of a thumbscrew 44. Projecting upwardly from the top flange 40 of each panel 38 are a plurality of longitudinally spaced lugs 47 positioned to be received in a corresponding plurality of slots 48 formed in the lower surface of each panel section. To mount one of the panels 38 in place, two thumbscrews 44 are loosely threaded in holes 42 in the facing side surfaces of the two legs 14 between which the panel is to be disposed. The lugs of the panel are then inserted in the slots 48 of the channel section extending between these legs, as shown in FIG. 5, and the panel is swung inwardly until its slots 45 engage the thumbscrews 44 on the legs. The thumbscrews are tightened to clamp the side flanges of the panel between the heads of the thumbscrews and the adjacent leg surfaces, thereby to secure the panel fixedly in place. The panel is thus held securely, yet may readily be removed if desired. As shown in FIGS. 1 and 2, such panels 38 may be mounted on one side and both ends of the desk, leaving the other side open to accommodate the legs of a person using the desk. Thumbscrew holes 42 are provided in all the legs, and slots 48 are provided in the lower surfaces of all the channel sections, so that the panels 38 may be mounted between any two legs, enabling use of the desk by a person sitting on either side.

The described desk also includes a drawer 50, comprising a drawer head 51 mounted on the front end of a conventional drawer assembly of side, back and bottom panels, and suitable for holding desk supplies. The structure of the drawer, drawer-supporting structure, and associated elements are shown in FIGS. 11–19.

As there illustrated, the drawer is supported between a pair of horizontally elongated hanger elements 52 extending in spaced parallel relation across the lower surface of the top panel 11 from side to side thereof. Each hanger has an inwardly projecting longitudinal top flange 53 which is flush with, and secured by screws 54, to, the lower surface of the top panel. At each end, each hanger is bent to form a vertical return flange 56 having a major vertical surface in a plane parallel to the direction of drawer movement.

A pair of drawer rails 58 are respectively secured at their ends to the return flanges of the two hangers 52. Each of these rails has a horizontal, inwardly projecting rail portion 60 extending from side to side of the desk, and a depending vertical flange portion 61 coextensive with and projecting below the rail portion.

Each side panel of the drawer 50 bears on its outer surface a cooperating horizontally elongated rail member 63 which extends over and rides on one of the rails 60 so as to support the drawer on the rails for a sliding movement between a closed position in which the drawer is entirely underneath the desk top panel and an open position under which the drawer projects forwardly from the desk top panel. As particularly shown in FIG. 11, the ends of the hanger members 52 are offset inwardly with respect to the adjacent edge of the top panel 11, and when the drawer is closed the head 51 butts against and overlaps the adjacent hanger ends.

Each side panel of the drawer 50 also bears, on its outer surface and adjacent to its rearward extremity, an angle member 67 which projects outwardly and slopes upwardly toward the rear of the drawer. Adjacent to each end of each rail member 58, the flange portion 61 bears a stop projection 70 formed by punching inwardly a small triangular area of the flange. When the drawer 50 is pulled out to its forward position, the angle members 67 engage the stop projections 70 at the forward ends of the two rails, to arrest outward movement of the drawer; but the drawer may be removed from the rails by lifting it slightly so that the members 67 clear the stop projections 70.

Each of the rails 58 also bears at each end a fixed glide element 72 formed, e.g. of nylon or the like and positioned to be interposed between the rail members 60 and 63; further nylon glide elements 73 (FIG. 16) are carried by the rail members 63, also in position to be interposed between rail members 60 and 63. The glide members 72 at the forward ends of the rails are interposed between the rail portions 60 and the cooperating members 63 of the drawer, to facilitate sliding movement of the drawer.

The foregoing drawer and support structures are broadly conventional, except that the rails 58 are open at each end, and bear identical stop projections 70 and glides 72 at both ends so that the drawer may be inserted between the rails from either side of the desk. The stop projections and glides at the ends of the rails adjacent to the front of the drawer cooperate with the drawer structures in the manner just described, regardless of whether the drawer is positioned on one side of the desk or on the other. It will be understood that ordinarily the drawer is positioned to open on the side of the desk on which the user sits, and may be either on the left hand or right hand side of the user.

When a vertical panel 38 is mounted on the side of the desk opposite to the user, as described above, this panel extends over and conceals the open rear ends of the drawer rails and hanger members. However, when a panel 38 is not used, a small filler panel 74 (shown in FIGS. 14 and 17–19), simulating a drawer head in appearance, is mounted on the rails in the manner now to be described to conceal the open ends of the rails.

The filler 74 comprises a horizontally elongated and rectangular steel member 76 simulating a drawer head and dimensioned to extend between and overlap the ends of the two hanger members 52. Mounted on the inner surface of the simulated drawer head 76 a pair of spring clips 78 project generally horizontally inward from the simulated head 76 and are positioned to overlie the two rails 58. Each clip 78 has an inner end portion 79 bent downwardly and outwardly to form a hook which engages the inner edge of the nylon glide 72 positioned adjacent to the open end of one of the rails. As indicated in FIG. 19, the clips 78 are ordinarily bent slightly downward in a horizontal position; when they are hooked over nylon glides 72 of the rails 58 in the manner described, they are slightly deformed upwardly, and the simulated head 76 bears against the adjacent ends of the hangers 52, being held securely clamped in such position by the slightly deformed spring clips 73; thus the simulated drawer head 76 may readily be positioned at either end of the rails (i.e., when the drawer is at the other end), and may equally readily be disengaged when it is desired to reverse the position of the drawer.

I claim:
1. In an article of furniture, in combination,
   (a) a top panel having a horizontal lower surface;
   (b) a plurality of identical legs each comprising a straight hollow metal tube of square cross-section open at its upper end; and
   (c) a plurality of identical brackets, equal in number to said legs, mounted at spaced localities on said panel lower surface for securing said legs rigidly in vertical position to said panel, each of said brackets comprising
       (i) a vertical solid metal post of square cross-section dimensioned to fit tightly within one of said legs, said post having longitudinal bevelled edges extending downwardly to its lower end and being press-fitted within the upper end of said one leg, and
       (ii) a pair of horizontal solid metal arms, each rigidly and fixedly scured at one end to the upper end portion of said post, and extending divergently therefrom along said top panel lower surface, each of said arms being secured to said top panel by a plurality of longitudinally spaced screws.

2. In a desk or the like, in combination,
   (a) a rectangular top panel having horizontal upper and lower surfaces;
   (b) four identical legs each comprising a straight hollow metal tube of square cross-section open at its upper end; and
   (c) four identical brackets respectively mounted adjacent to the corners of the top panel on said panel lower surface for securing said legs rigidly in vertical position to said panel, each of said brackets comprising
       (i) a vertical solid metal post of square cross-section dimensioned to fit tightly within one of said legs, said post having longitudinal bevelled edges extending downwardly to its lower end and being press-fitted within the upper end of said one leg, and
       (ii) a pair of horizontal solid metal arms, each rigidly and fixedly secured at one end to the upper end portion of said post, and extending divergently therefrom along said top panel lower surface in respectively parallel relation to the adjacent edges of said panel, each of said arms being secured to said top panel by a plurality of longitudinally spaced screws, the arms of adjacent brackets extending parallel to a common edge of said panel projecting toward each other in aligned relation.

3. A desk or the like as defined in claim 2, wherein the outer side surfaces of each horizontal arm of each said bracket are offset inwardly with respect to the outwardly facing surfaces of the vertical post thereof; wherein each said leg has four vertical walls extending upwardly, in surrounding relation to the vertical post of the bracket to which it is secured, into abutment with said top panel lower surface, each inwardly-facing wall of each said leg being partially cut away at the inwardly-facing corner of the upper end of the leg to accommodate the horizontal arms of the bracket to which it is secured; and further including four upwardly-opening and horizontally elongated metal channel sections, extending along said top panel lower surface in respectively parallel adjacent relation to the edges of said top panel, each of said channel sections extending between two of said brackets and receiving and enclosing at its opposite ends the horizontal arms of said two brackets which parallel the same edge of said top panel to which the channel section is parallel, each said channel section having an inwardly projecting longitudinal flange in flush engagement with, and secured by longitudinally spaced screws to, said top panel lower surface.

4. A desk or the like as defined in claim 3, wherein at least two of said legs, respectively disposed at opposite ends of one of said channel sections, have tapped holes in their facing side walls spaced downwardly from said one channel section; wherein said one channel section has a plurality of longitudinally spaced slots in its lower surface; and further including a rectangular vertical panel, extending between said two legs and downwardly from said one channel section, said vertical panel having an inwardly projecting horizontal top flange extending along said one channel section and bearing a plurality of spaced upwardly projecting lugs respectively received within said slots of said one channel section, said vertical panel further having two inwardly projecting vertical flanges at its opposite sides respectively extending along said facing walls of said two legs and bearing inwardly opening notches respectively positioned in register with said tapped holes of said two legs; and a pair of screws respectively threaded in said tapped holes and extending through said notches for detachably mounting said vertical panel between said legs.

5. A desk or the like as defined in claim 2, further including
   (a) a drawer having vertical side panels each bearing an outwardly projecting longitudinal rail member and each further bearing an outwardly projecting stop element adjacent to its rearward extremity; and
   (b) a pair of horizontal rails fixedly suspended beneath and extending across said top panel lower surface from side to side thereof in spaced parallel relation for slidably supporting said drawer between them, said rails being adapted to receive said drawer from either side of said top panel, drawer side panel rail members respectively resting on upper surfaces of said rails, the upper surface of each said rail bearing at each end an upwardly projecting glide element positioned to be interposed between the rail and the drawer side panel rail member resting thereon, and each said rail further bearing at each end a stop projection positioned and adapted to engage one of said stop elements of said drawer to arrest outward movement of said drawer at such end of the rail, said stop elements and stop projections being disengageable, to permit removal of said drawer from said rails, by lifting of said drawer.

6. A desk or the like as defined in claim 5, further including a filler panel comprising
   (a) a horizontally elongated vertical panel member extending between and overlapping the ends of said rails on one side of said top panel; and
   (b) a pair of spring clips secured to and projecting inwardly from said panel member, respectively in alignment with said rails, and positively engaging end portions of said rails to detachably secure said panel member thereto.

7. A desk or the like comprising
   (a) a rectangular top panel having plane upper and lower surfaces;
   (b) a plurality of spaced legs secured to and supporting said top panel in horizontal position;
   (c) a drawer having vertical side panels each bearing an outwardly projecting longitudinal rail member and each further bearing an outwardly projecting stop element adjacent to its rearward extremity;
   (d) a pair of horizontal rails fixedly suspended beneath and extending across said top panel lower surface from side to side thereof in spaced parallel relation for slidably supporting said drawer between them, said rails being adapted to receive said drawer from either side of said top panel, drawer side panel rail members respectively resting on upper surfaces of said rails, the upper surface of each said rail bearing at each end an upwardly projecting glide element positioned to be interposed between the rail and the drawer side panel rail member resting thereon, and each said rail further bearing at each end a stop projection positioned and adapted to engage one of said stop elements of said drawer to arrest outward movement of said drawer at such end of the rail, said stop elements and stop projections being disengageable, to permit removal of said drawer from said rails, by lifting of said drawer.

8. A desk or the like as defined in claim 7, further including a filler panel comprising
   (a) a horizontally elongated vertical panel member extending between and overlapping the ends of said rails on one side of said top panel; and
   (b) a pair of spring clips secured to and projecting inwardly from said panel member, respectively in alignment with said rails, and positively engaging end portions of said rails to detachably secure said panel member thereto.

References Cited
UNITED STATES PATENTS

| | | | |
|---|---|---|---|
| 3,360,318 | 12/1967 | Stodinski | 312—194 |
| 3,434,768 | 3/1969 | Schreyer | 312—194 |

PATRICK D. LAWSON, Primary Examiner